US005954448A

United States Patent [19]

Shim

[11] Patent Number: 5,954,448

[45] Date of Patent: Sep. 21, 1999

[54] APPARATUS FOR COUPLING VIDEO PRINTED CIRCUIT BOARD ASSEMBLY OF MONITOR

[75] Inventor: Jae-Soo Shim, Suwon-si, Rep. of Korea

[73] Assignee: SamSung Electronics Co., Ltd., Kyungki-do, Rep. of Korea

[21] Appl. No.: 08/910,563

[22] Filed: Aug. 20, 1997

[30] Foreign Application Priority Data

Aug. 20, 1996 [KR] Rep. of Korea ...................... 96-25019

[51] Int. Cl.[6] ........................................................ F16B 3/24

[52] U.S. Cl. ........................... 403/291; 403/344; 439/575

[58] Field of Search ..................................... 439/574, 575, 439/527; 403/327, 326, DIG. 7, 344, 291; 285/321, 305

[56] References Cited

U.S. PATENT DOCUMENTS 3,980,805 9/1976 Lipari .................................. 285/321 X 5,297,823 3/1994 Dubost ................................ 285/321 X

FOREIGN PATENT DOCUMENTS 47301 1/1973 United Kingdom ................... 285/305

571286 11/1993 United Kingdom ................... 285/321

*Primary Examiner*—Lynne Reichard

*Assistant Examiner*—David E. Bochna

*Attorney, Agent, or Firm*—Robert E. Bushnell, Esq.

[57] ABSTRACT

A video printed circuit board is mounted on a slotted holder which closely receives the neck of a CRT and has a plurality of circumferentially-diverged apertures which receive projections extending from a circumscribing elastic band that compresses the holder, the projections frictionally engaging the neck.

15 Claims, 5 Drawing Sheets

APPARATUS FOR COUPLING VIDEO PRINTED CIRCUIT BOARD ASSEMBLY OF MONITOR

CLAIM OF PRIORITY

This application makes reference to, incorporates the same herein, and claims all benefits accruing under 35 U.S.C. §119 from an application entitled *APPARATUS FOR COUPLING VIDEO PRINTED CIRCUIT BOARD ASSEMBLY OF MONITOR* earlier filed in the Korean Industrial Property Office on Aug. 20, 1996, and there duly assigned Serial No. 96-25019 by that Office.

BACKGROUND OF THE INVENTION

1. Field of the Invention

The present invention relates to an apparatus for coupling a video printed circuit board with the neck of a cathode ray tube of a monitor.

2. Discussion of the Prior Art

The video printed circuit board (PCB) assembly typically is installed at the back end, on the neck, of the cathode ray tube (CRT) of a monitor. The first end of the CRT is very large and heavy, compared to the delicate neck portion. When assembled, the CRT socket and video PCB fitted on the neck pin exert great weight on the neck pin. The delicate neck pin cannot endure this weight infinitely. As the size of CRT increases, providing enhanced resolution, the size of the video PCB increases, and thus the weight increases. Because the video PCB is coupled by only the neck pin and the CRT socket, larger systems likely will suffer failed PCB/CRT connections.

An apparatus is needed that alleviates the potential mechanical and electrical failures between a cathode ray tube and video PCB.

SUMMARY OF THE INVENTION

In light of the above, the present invention is directed to an apparatus for coupling a video PCB assembly of a monitor that substantially obviates one or more of the problems illustrated above. The present invention contemplates: a video PCB assembly with a CRT having a CRT socket connected to a CRT neck; a video PCB connected to the CRT socket; a shield case and case cover at the back of the video PCB, shielding the emission of electromagnetic wave generated by the video PCB; a holder, fixed to the shield case; and an elastic cylindrical coupling part having a plurality of projections received into apertures formed in a circumscribing holder, to adhere to the surface of the neck.

A first object of the present invention is to provide an apparatus for coupling a video PCB assembly to the neck of the CRT.

A second object of the invention is to provide an apparatus for coupling a video PCB assembly to the neck of a CRT that is reliable and easy to assemble.

Additional features and advantages of the invention will be ascertained from the following description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 1:
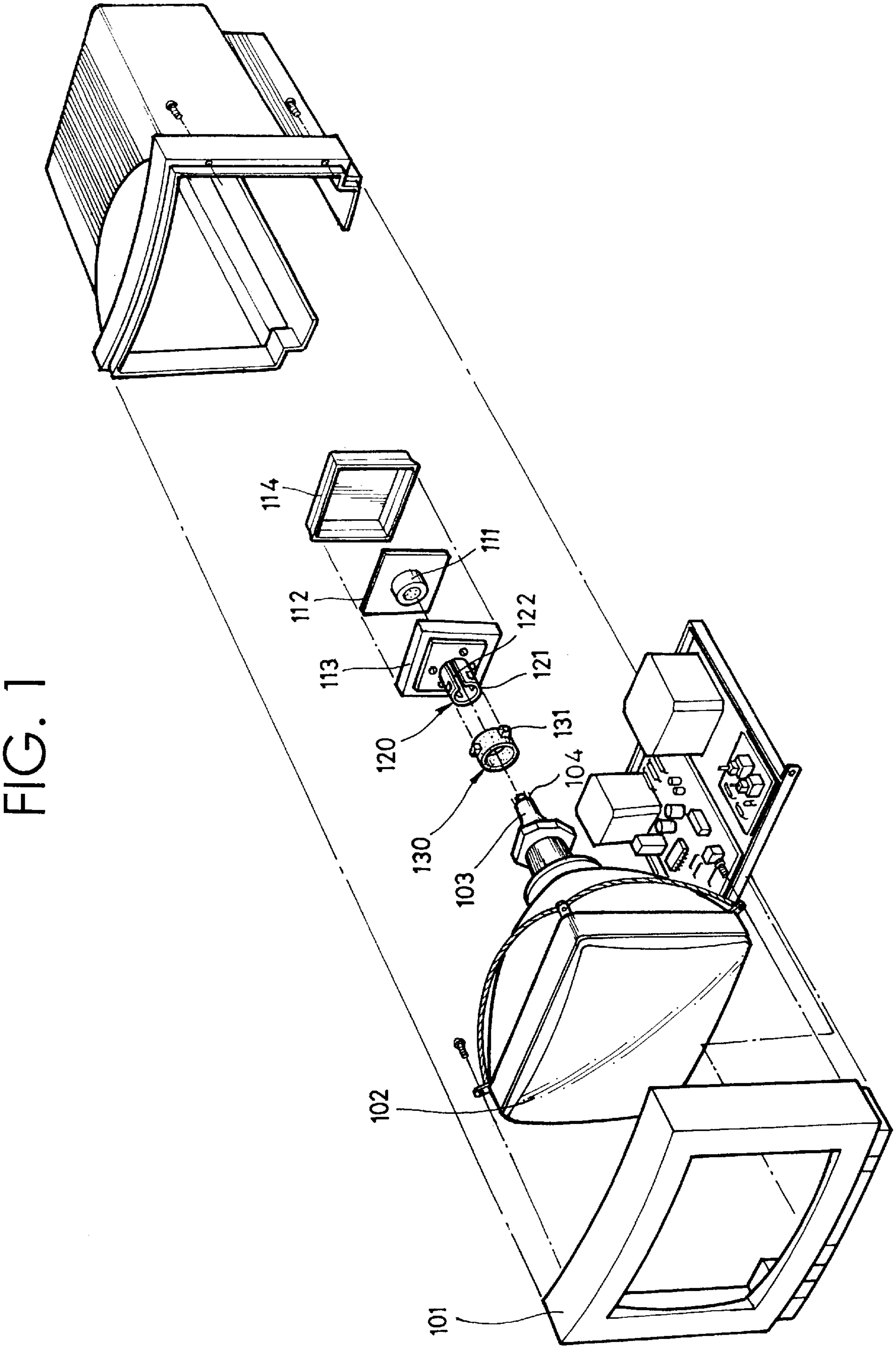
FIG. 1 is a top front exploded perspective view of the invention.
Figure 2:
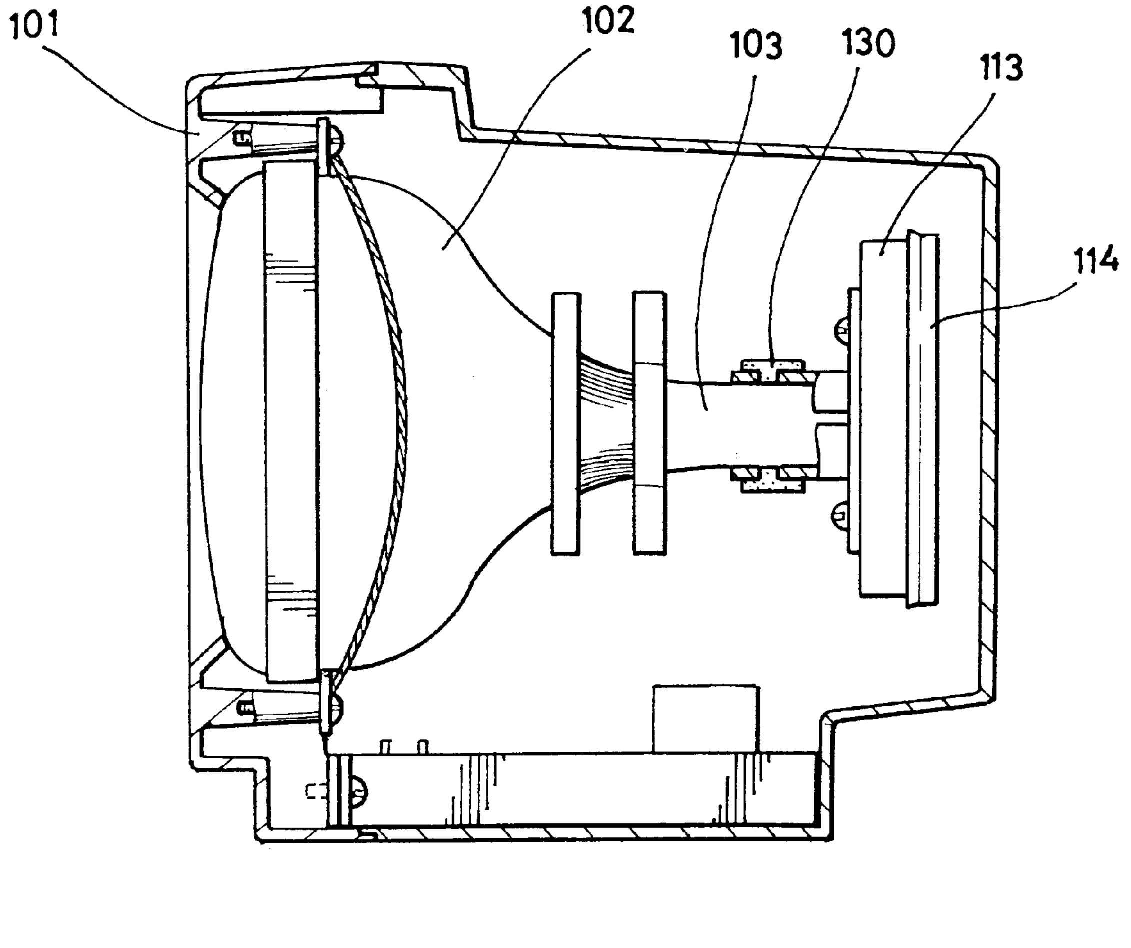
FIG. 2 is a cross sectional detailed view of the embodiment shown in FIG. 1, as assembled.

Referring to FIGS. 1 and 2, a cathode ray tube (CRT) 102 is mounted on a front case 101. The CRT 102 mates with a CRT socket 111 at the back in the portion commonly referred to as the neck 103 of the CRT 102. The socket 111 is mounted on a video printed circuit board (PCB) 112. The CRT socket 111 circumscribes the neck pin 104 of the neck 103. The neck pin 104 is very thin and too fragile to bear the weight of the video PCB 112.

The video PCB 112 is installed inside a shield case 113 to suppress harmful electromagnetic emission. The metal shield case 113 has an aperture **113*a* (FIG. 6) which receives the neck 103. A cover 114 is mounted on the shield case 113**.

Figure 6:
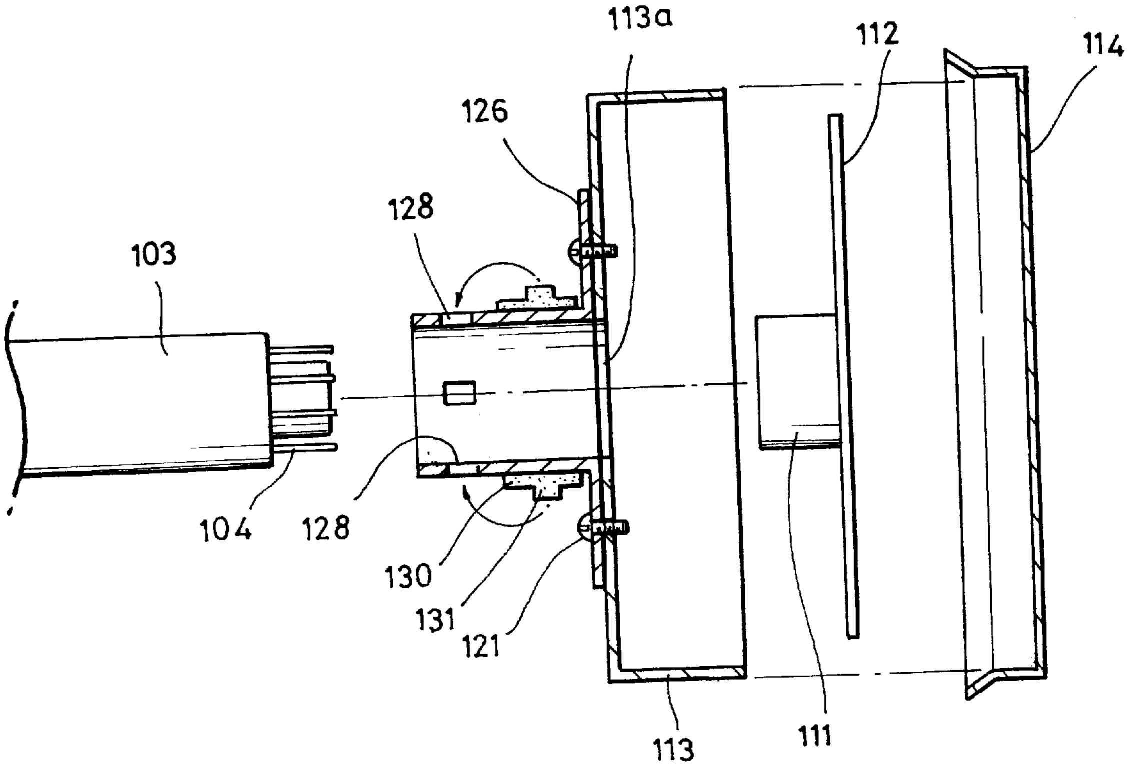
FIG. 6 is a partial cross sectional detailed view of the present holder prior to receiving the neck of the CRT.

Referring also to FIG. 6, a holder 120, including a coupling piece 126, is mounted on the shield case 113 with fasteners 121. The inner diameter 200 (FIG. 7) of the coupling piece 126 is larger than the diameter of the aperture **113*a* of the shield case 113. The inner diameter 200 of the coupling piece 126 is substantially the same as or slightly larger than the outer diameter of the neck 103. The neck 103 is intended to be closely received in the coupling piece 126**.

Figure 5:
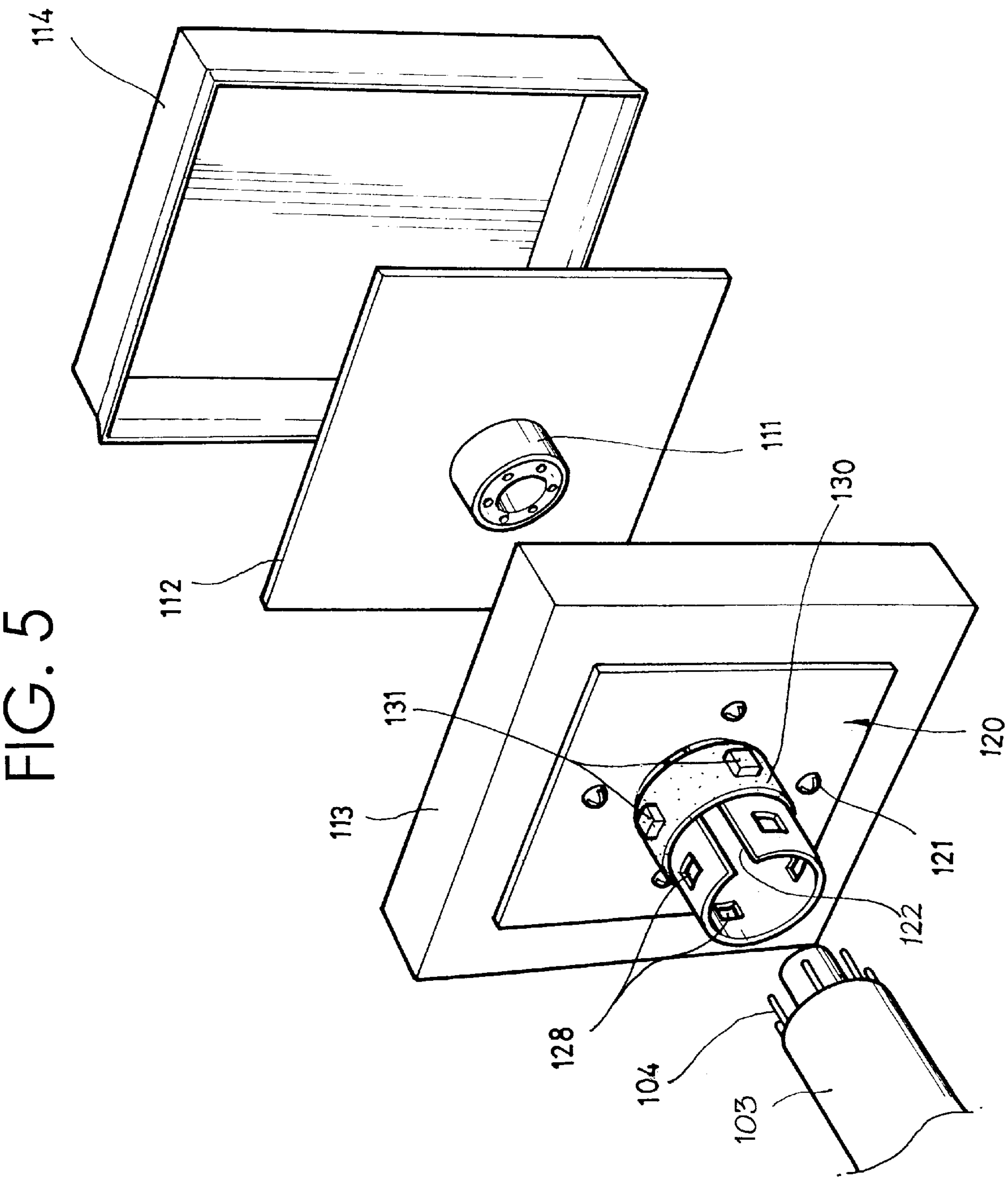
FIG. 5 is a partial top right front exploded perspective view of the invention partially installed.

Referring to FIG. 5, the coupling piece 126 has an axial groove 122 to allow for adjusting the inner diameter 200. As the inner diameter of the neck 103 and coupling piece 121 increase, additional axial grooves (not shown) may be required. The coupling piece 126 of the holder 120 also has apertures 128 circumferentially diverged toward the front portion thereof.

Figure 3:
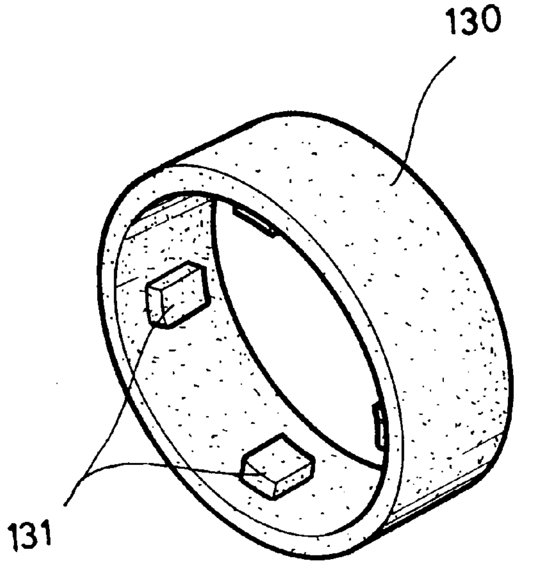
FIG. 3 is a top right front perspective view of the cylindrical elastic coupling of the invention.
Figure 4:
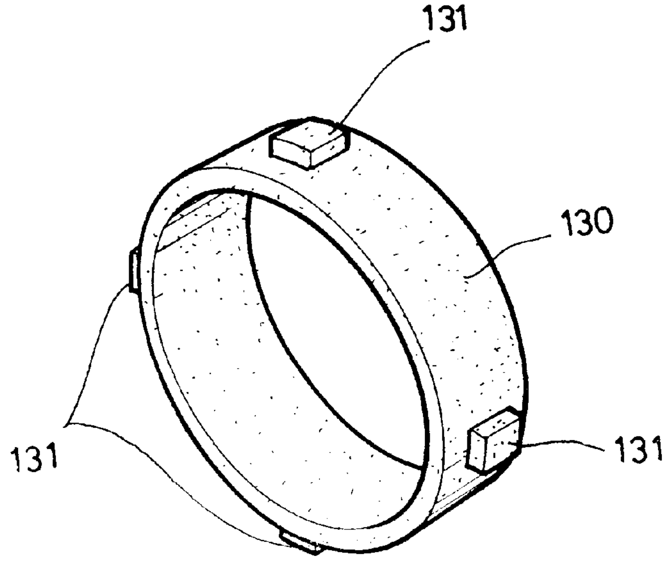
FIG. 4 is a top right front perspective view of the cylindrical elastic coupling in design position.
Figure 7:
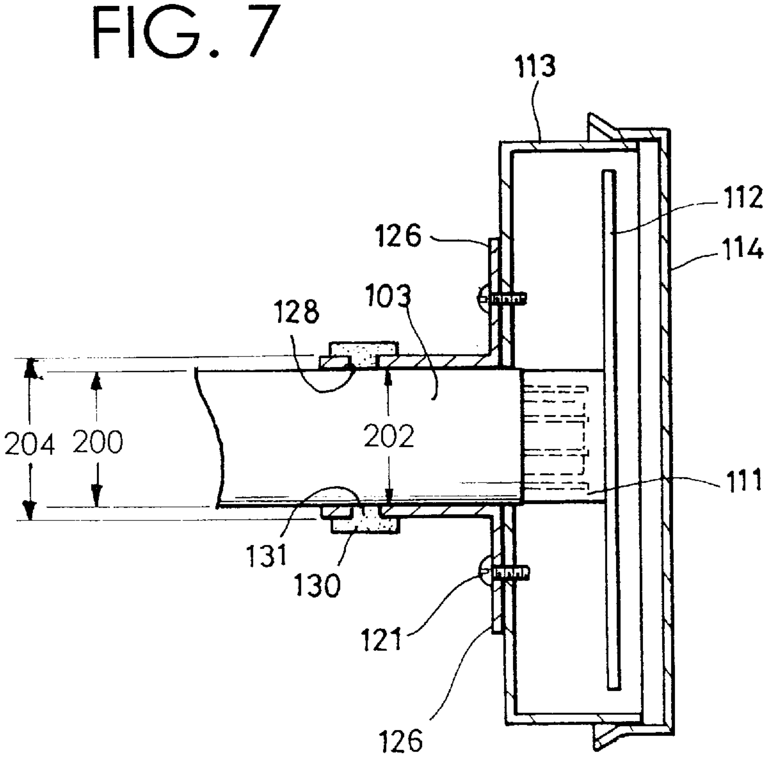
FIG. 7 is a partial cross sectional detailed view of the present holder having received the neck of the CRT.

Referring to FIGS. 3, 4 and 7, the holder 120 includes an elastic band 130 circumscribing the coupling piece 126. The elastic band 130 has the same number of projections 131, extending radially inwardly, as the number of apertures 128. FIG. 3 illustrates the band 130 in the intended design position.

FIG. 7 shows the state in which the coupling is completed, with the elastic band 130 contacting the neck 103 of the CRT. The inner diameter 202 of the elastic band, as defined by the innermost extension of the projections 131, is slightly smaller than the outer diameter 204 of the coupling piece 126 so as to affect frictional interengagement. The elastic band 130 fits over the outer diameter 204 of the coupling piece 126 of the holder 120, with the projections 131 received through the apertures 128. The elastic band 130, while slightly stretching, also compresses the coupling piece 126. When the holder 120 is assembled to fit the neck 103 within an inner diameter 200 of the coupling piece 126, compression caused by elastic band 130 enhances the connection between the coupling piece 126 and the neck 103.

Referring to FIGS. 6 and 7, prior to assembly of the CRT neck 103 with the coupling piece 126, the elastic band 130 is turned over, with the projections 131 extending outwardly, facilitating insertion of the neck 103. Once, the neck 103 is inserted, the band is turned over, as shown in FIG. 7, such that the projections 131 are received in the apertures 128. The projections frictionally engage the surface of the neck 103. The inner diameter 200 of the elastic band 130 is smaller than the outer diameter 204 of the coupling piece 126 so that the inner diameter 200 of the cylindrical coupling piece 126 becomes smaller, owing to reduction in the size in the groove 122 (FIG. 5), and adheres to the neck 103. Consequently, the coupling piece 126 of the holder 120 is fixed to the neck 103 by friction between the coupling piece 126 and neck 103, as well as between the projections 131 of the elastic band 130 and the neck 103. This secure arrangement assures that neither the video PCB assembly 112 nor the holder 120 comes off the neck 103.

The present invention is not limited to monitor applications, but may be applied to all mechanisms in which a circumscribing holder is coupled with a necked-down member.

It will be apparent to those skilled in the art that various modifications and variations can be made in an apparatus for coupling a video PCB assembly of a monitor of the present invention without departing from the spirit or scope of the invention. Thus, it is intended that the present invention cover the modifications and variations of this invention within the scope of the appended claims.

What is claimed is:

1. An apparatus for coupling a video printed circuit board with a cathode ray tube having a neck, the apparatus comprising:

a holder including a coupling piece having a plurality of discrete apertures and a groove, said holder accommodating insertion of the neck, wherein said holder comprises a metal case to which said coupling piece is connected; and an elastic band mounted on said holder and having a plurality of arcuately spaced-apart radially extending projections, said projections being received in said apertures;

wherein said groove comprises an axial groove formed in said coupling piece along an axial direction thereof, thereby facilitating insertion of the neck into said holder.

2. The apparatus as recited in claim 1, said elastic band having an inner diameter slightly smaller than an outer diameter of said coupling piece so that said coupling piece and the neck come into close contact with each other due to compression of said elastic band.

3. The apparatus as recited in claim 1, wherein said projections define an inner diameter slightly smaller than an outer diameter of the neck.

4. The apparatus as recited in claim 1, wherein said projections are square shaped.

5. The apparatus as recited in claim 1, wherein said neck extends through said metal case so as to be joined to said printed circuit board.

6. An apparatus for coupling a video printed circuit board with a cathode ray tube, the cathode ray tube having a tapered segment of reduced cross-sectional dimension, the apparatus comprising:

a holder configured to closely receive the tapered segment; and an elastic band compressing said holder against the tapered segment;

wherein said holder has a cylindrical surface which is discontinuous so as to form an axial groove therein, said axial groove extending in an axial direction of said cylindrical surface, thereby facilitating insertion of the tapered segment into said holder, and wherein said holder comprises a metal case and a coupling piece connected to said metal case.

7. The apparatus as recited in claim 6, said band including at least one projection, and said holder having an aperture for each said at least one projection, each slot receiving a respective said at least one projection.

8. The apparatus as recited in claim 8, wherein said tapered segment extends through said metal case so as to be joined to said printed circuit board.

9. The apparatus as recited in claim 6, wherein said holder comprises a coupling piece, said elastic band having an inner diameter slightly smaller than an outer diameter of said coupling piece so that said coupling piece and the tapered segment come into close contact with each other due to compression of said elastic band.

10. The apparatus as recited in claim 6, wherein said elastic band includes at least one projection, said projection defining an inner diameter slightly smaller than an outer diameter of said tapered segment.

11. The apparatus as recited in claim 10, wherein said at least one projection is square shaped.

12. An apparatus for coupling a video printed circuit board with a cathode ray tube having a neck, the apparatus comprising:

a holder including a coupling piece having a plurality of discrete apertures and a groove, said holder accommodating insertion of the neck; and an elastic band mounted on said holder and having a plurality of arcuately spaced-apart radially extending projections, said projections being received in said apertures;

wherein said groove comprises an axial groove formed in said coupling piece along an axial direction thereof, thereby facilitating insertion of the neck into said holder; and wherein said coupling piece has a first flat portion mounted on a flat surface of said holder and a second cylindrical portion connected perpendicularly to said first flat portion, said apertures and said axial groove being formed in said second cylindrical portion.

13. The apparatus as recited in claim 12, wherein said neck extends through said holder so as to be joined to said printed circuit board.

14. An apparatus for coupling a video printed circuit board with a cathode ray tube, the cathode ray tube having a tapered segment of reduced cross-sectional dimension, the apparatus comprising:

a holder configured to closely receive the tapered segment; and an elastic band compressing said holder against said tapered segment;

wherein said holder has a cylindrical surface which is discontinuous so as to form an axial groove therein, said axial groove extending in an axial direction of said cylindrical surface thereby facilitating insertion of the tapered segment into said holder;

wherein said coupling piece has a first flat portion mounted on a flat surface of said holder and a second cylindrical portion connected perpendicularly to said first flat portion, said apertures and said axial groove being formed in said second cylindrical portion.

15. The apparatus as recited in claim 14, wherein said tapered segment extends through said holder so as to be joined to said printed circuit board.

* * * * *